United States Patent
Gutta et al.

(10) Patent No.: US 7,190,809 B2
(45) Date of Patent: Mar. 13, 2007

(54) ENHANCED BACKGROUND MODEL EMPLOYING OBJECT CLASSIFICATION FOR IMPROVED BACKGROUND-FOREGROUND SEGMENTATION

(75) Inventors: Srinivas Gutta, Yorktown Heights, NY (US); Antonio J. Colmenarez, Maracaibo (VE); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 700 days.

(21) Appl. No.: 10/184,517

(22) Filed: Jun. 28, 2002

(65) Prior Publication Data

US 2004/0001612 A1    Jan. 1, 2004

(51) Int. Cl.
*G06K 9/00* (2006.01)
(52) U.S. Cl. ................. 382/103; 382/228; 348/169
(58) Field of Classification Search ............... None
See application file for complete search history.

(56) References Cited

U.S. PATENT DOCUMENTS

| | | | | |
|---|---|---|---|---|
| 5,355,326 A * | 10/1994 | Florent | | 348/169 |
| 5,471,544 A * | 11/1995 | Markandey et al. | | 382/264 |
| 5,666,157 A * | 9/1997 | Aviv | | 348/152 |
| 6,049,619 A | 4/2000 | Anandan et al. | | 382/107 |
| 6,184,858 B1 | 2/2001 | Christian et al. | | 345/114 |
| 6,335,988 B1 | 1/2002 | Kondo | | 382/236 |
| 6,424,370 B1 * | 7/2002 | Courtney | | 348/143 |
| 6,542,621 B1 * | 4/2003 | Brill et al. | | 382/103 |
| 6,570,608 B1 * | 5/2003 | Tserng | | 348/143 |
| 2003/0058237 A1 * | 3/2003 | Lee | | 345/418 |
| 2003/0156759 A1 * | 8/2003 | Colmenarez et al. | | 382/228 |

FOREIGN PATENT DOCUMENTS

| EP | 0671706 A2 | 9/1995 |
|---|---|---|
| EP | 0367295 B1 | 1/1997 |
| EP | 0903695 A1 | 3/1999 |

OTHER PUBLICATIONS

Ren et al. "Motion Detection with Non-stationary Background", Image Analysis and Processing, 2001. Proceedings. 11th International Conference on Sep. 26-28, 2001 pp. 78-83.*

Ude et al., "Real-Time Visual System for Interaction with a Humanoid Robot", Robotics and Autonomous System, Elsevier Science Publishers, Amsterdam, NL, vol. 37, No. 2-3, Nov. 2001, pp. 115-125, XP004320520.

* cited by examiner

*Primary Examiner*—Bhavesh M. Mehta
*Assistant Examiner*—Christopher Lavin (57) ABSTRACT

A method and apparatus are disclosed for generating and maintaining enhanced background models for use in background-foreground segmentation. Background models are modified to contain an indication of objects that are typically stationary. Thereafter, if an object moves and has been previously identified as an object that is typically stationary, the object will not unnecessarily be identified as part of the foreground during background-foreground segmentation. In an exemplary implementation, moving objects are classified into two sets. A first set includes objects that typically move independently and a second set includes objects that are typically stationary. Generally, once an object is assigned to the second (stationary object) set, the object will remain in the background, even if the object is moved (normally, movement of the object would cause the object to become part of the foreground).

17 Claims, 5 Drawing Sheets

ENHANCED BACKGROUND MODEL EMPLOYING OBJECT CLASSIFICATION FOR IMPROVED BACKGROUND-FOREGROUND SEGMENTATION

FIELD OF THE INVENTION

The present invention relates to background-foreground segmentation performed by computer systems, and more particularly, to the generation and maintenance of improved background models for use in background-foreground segmentation.

BACKGROUND OF THE INVENTION

Background-foreground segmentation is a well-known computer vision based technique for detecting objects in the field of view of a stationary camera. Initially, a system learns a scene during a training phase while no objects are present. A background model of the scene is built during the training phase using a sequence of images captured from the scene. Thereafter, during normal operation, new images are compared with the background model. Pixel positions with significant deviation from the background model are classified as foreground pixels, while the remaining pixels are labeled as background pixels. The output of the algorithm is generally a binary image depicting the silhouette of the foreground objects found in the scene.

Conventional background-foreground segmentation techniques perform well for segmenting and tracking people and other objects in open outdoor areas, such as a parking lot, or enclosed, spacious facilities, such as warehouses, office spaces, or subway platforms. These scenes, however, are quite different from those of a typical home. For example, a residential environment typically contains many objects in a small area. In addition, many objects in a residential environment are non-rigid, such as garments and curtains, or deformable, such as furniture and blinds (or both), and people tend to frequently vary their pose in a residential environment, such as between a standing, sitting and laying down position.

Most existing background-foreground segmentation techniques do not perform well in the presence of occlusions of lower body parts in cluttered environments, non-upright body poses, and spontaneous movement of large background objects such as doors, chairs, and tables. A need therefore exists for a method and apparatus for generating and maintaining improved background models for use in background-foreground segmentation.

SUMMARY OF THE INVENTION

Generally, a method and apparatus are disclosed for generating and maintaining improved background models for use in background-foreground segmentation. According to one aspect of the invention, enhanced background models are employed to improve the segmentation of the foreground and background. The background model is modified in accordance with the present invention to contain an indication of objects that are typically stationary. Thereafter, if an object moves and has been previously identified as an object that is typically stationary, the object will not unnecessarily be identified as part of the foreground during background-foreground segmentation.

In an exemplary implementation, moving objects are classified into two sets. A first set includes objects that typically move independently, such as humans and animals, and a second set includes objects that are typically stationary, such as furniture. Generally, once an object is assigned to the second (stationary object) set, the object will remain in the background, even if the object is moved (normally, movement of the object would cause the object to become part of the foreground).

The enhanced background models of the present invention can be employed to improve background-foreground segmentation. During a training procedure, the parameters of the background model is estimated. When movement of an object is detected, the object is classified into one of the two sets. During normal operation, the likelihood probability of captured images is estimated using the background models. Pixels with low likelihood probability of belonging to the background scene that have not previously been flagged as stationary objects are classified as foreground, while the rest are labeled as background.

A more complete understanding of the present invention, as well as further features and advantages of the present invention, will be obtained by reference to the following detailed description and drawings.

DETAILED DESCRIPTION

Figure 1:
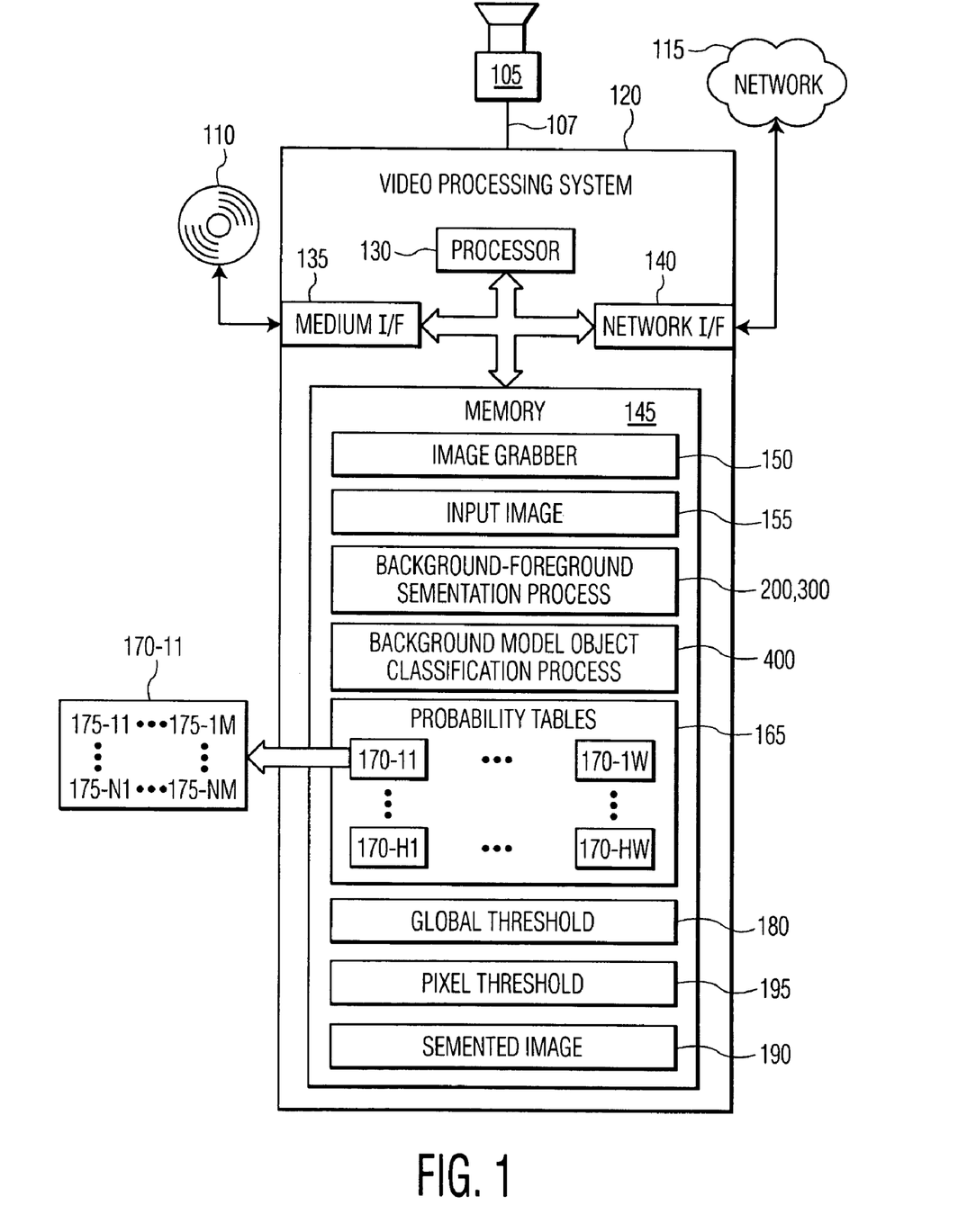
FIG. 1 is a block diagram of an exemplary system for performing background-foreground segmentation in accordance with a preferred embodiment of the invention.

Referring now to FIG. 1, a video processing system 120 is shown that generates and maintains a background model in accordance with preferred embodiments of the present invention for background-foreground segmentation. Video processing system 120 is shown interoperating with one or more cameras, such as camera 105, through video feed 107, a Digital Versatile Disk (DVD) 110 and a network 115. Video processing system 120 comprises a processor 130, a medium interface 135, a network interface 140, and a memory 145. Memory 145 comprises image grabber 150, an input image 155, a background model generation/maintenance process 200/300, a background model object classification process 400, probability tables 165, a global threshold 180, a pixel threshold 195, and a segmented image 190.

In the exemplary embodiment, the background model is embodied as a set of probability tables 165, discussed below, that comprise a plurality of probability tables 170-11 through 170-HW. One probability table 170-11 is shown in FIG. 1 comprising entries 175-11 through 175-NM. A background model is generally built for each camera to facilitate the fast segmentation of foreground and background. In order to prevent the need for background models to detect every object (for treatment as a foreground object), the background model is modified in accordance with the present invention to contain an indication of objects that are typically stationary. Thereafter, if an object moves and has been previously identified as an object that is typically stationary, the object will not unnecessarily become part of the foreground during background-foreground segmentation.

In one implementation, moving objects are classified into one of two sets. A first set includes objects that typically move independently, such as humans and animals. When an object from the first set moves in an image, the object should become part of the foreground. The second set includes objects that are typically stationary, such as furniture. Generally, once an object is assigned to the second set, the object will remain in the background, even if the object is moved (normally, movement of the object would cause the object to become part of the foreground). In this manner, background objects do not unnecessarily become part of the foreground when they are moved.

As shown in FIG. 1, video processing system 120 couples video feed 107 from camera 105 to image grabber 150. Image grabber 150 "grabs" a single image from the video feed 107 and creates input image 155, which will generally be a number of pixels. Illustratively, input image 155 comprises H pixels in height and W pixels in width, each pixel having 8 bits for each of red, green, and blue (RGB) information, for a total of 24 bits of RGB pixel data. Other systems may be used to represent an image, but RGB is commonly used.

Figure 2:
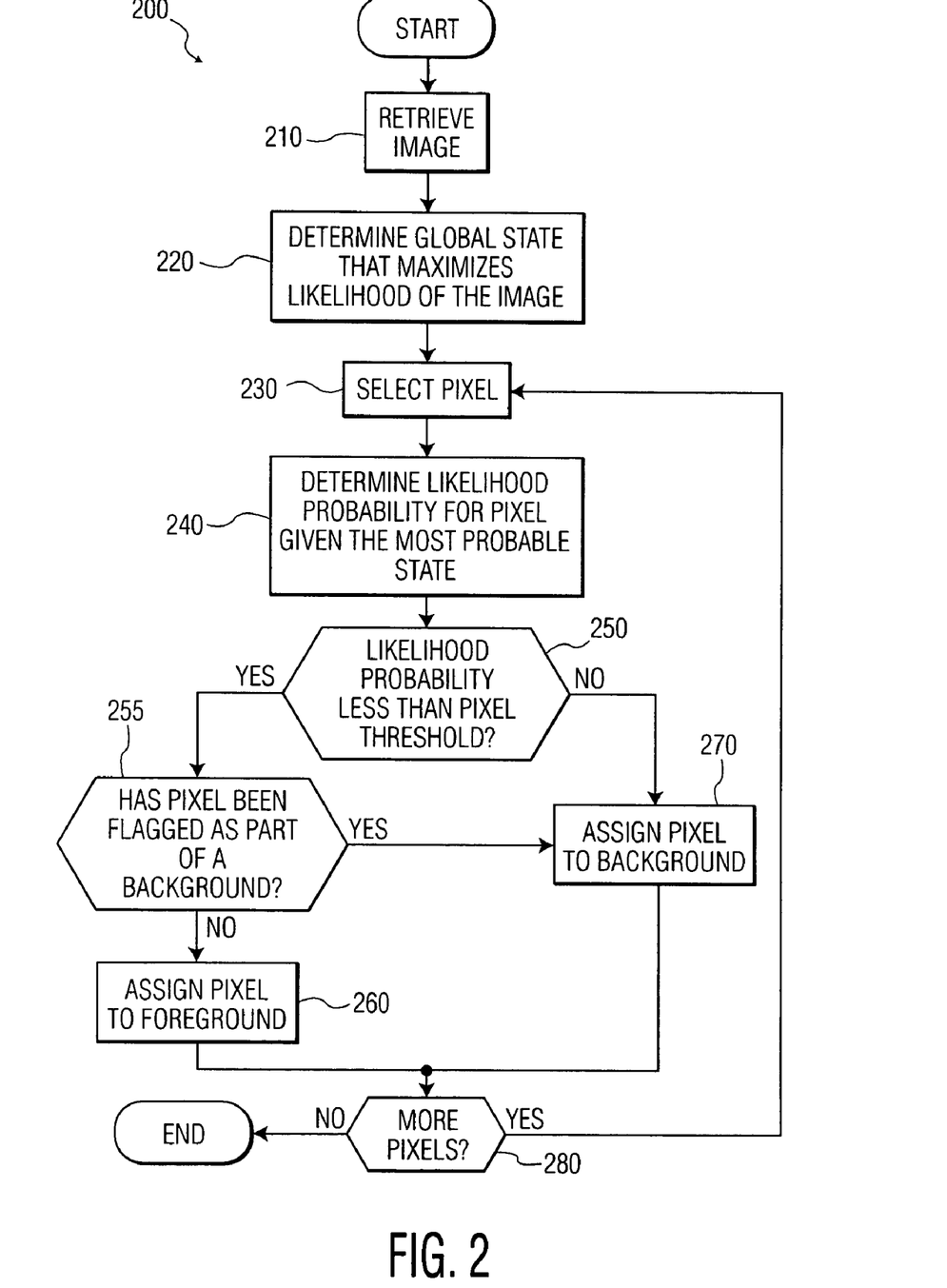
FIG. 2 is a flowchart of a method for classification of input images for a system that performs background-foreground segmentation, in accordance with a preferred embodiment of the invention.
Figure 3A:
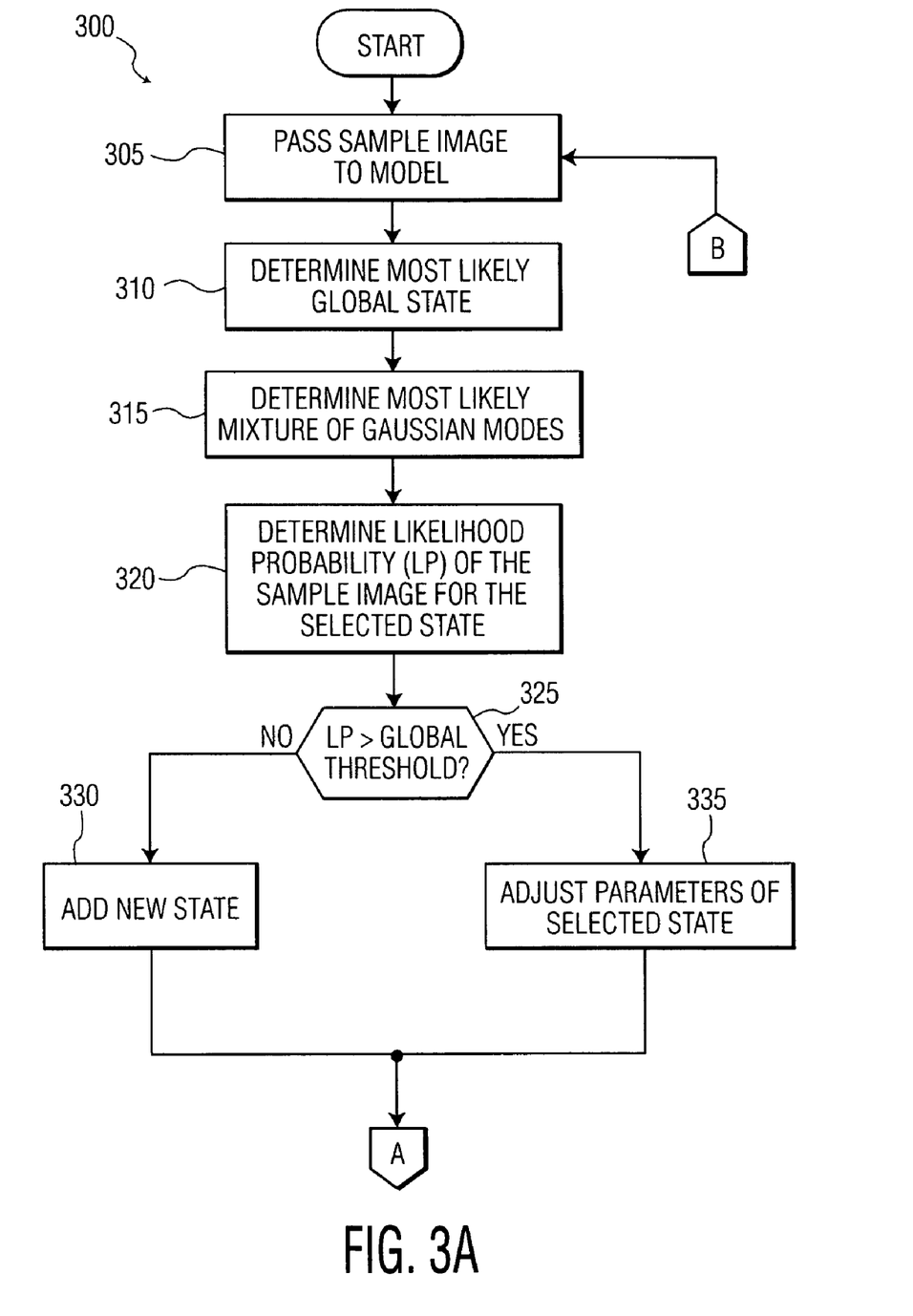
FIG. 3 is a flowchart of a method for training a system that performs background-foreground segmentation, in accordance with a preferred embodiment of the invention.
Figure 3B:
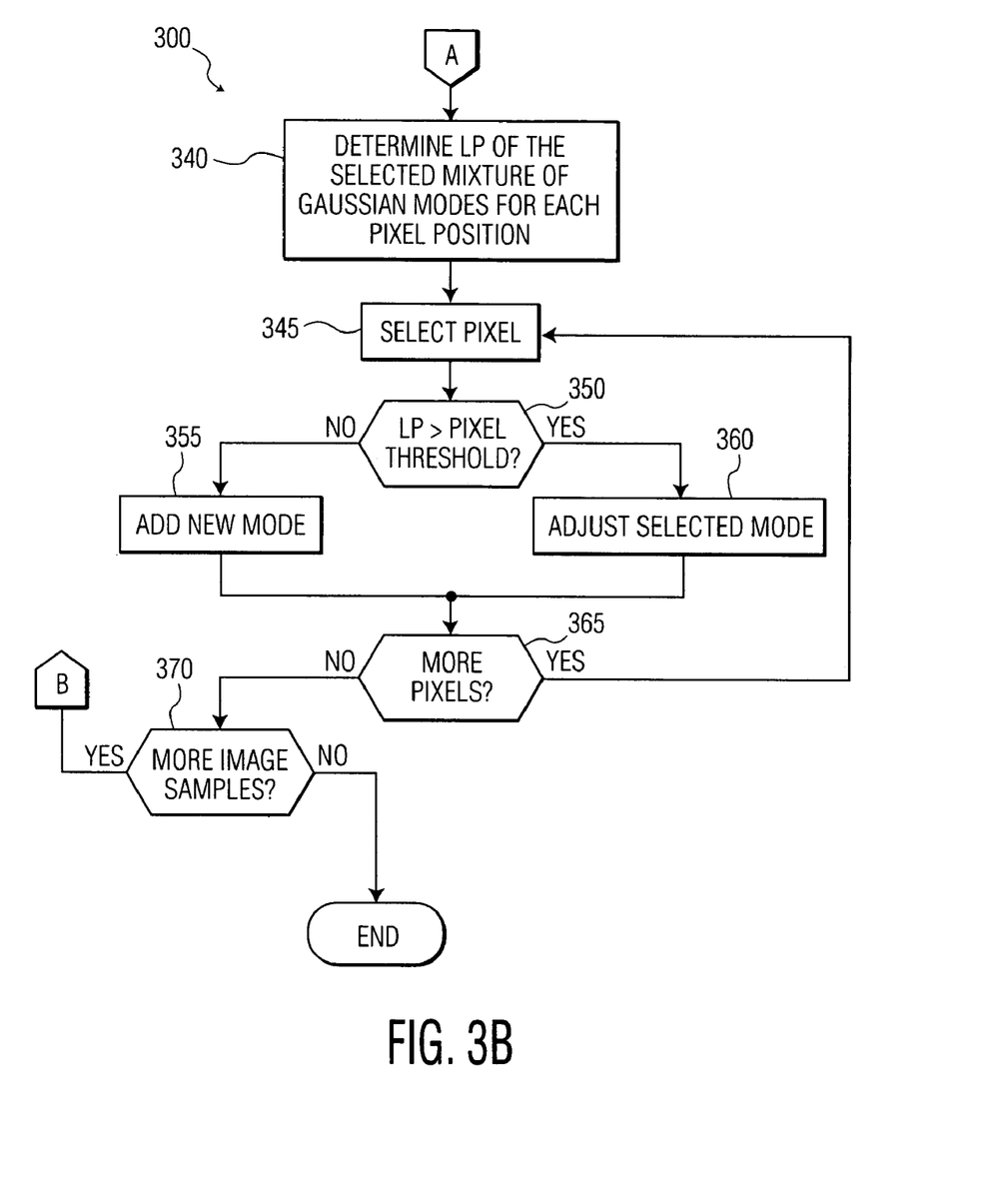

The background-foreground segmentation process 200, 300 generates the background model and performs background-foreground segmentation. Background-foreground segmentation process 200 is used during normal operation of video processing system 120, while background-foreground segmentation process 300 is used during training to generate the background model. It is expected that one single process will perform both processes 200 and 300, and that the single process will simply be configured into either normal operation mode or training mode. However, separate processes may be used, if desired.

During normal operation of video processing system 120, the background-foreground segmentation process 200 uses the probability tables 165 to determine likelihood probabilities for each of the H×W pixels in input image 155. Each of the likelihood probabilities is compared with the pixel threshold 195. If the likelihood probability is below pixel threshold 195, then the pixel is assumed to belong to the background. It is also possible to modify probability models used by the background-foreground segmentation process 200 to allow video processing system 120 to assume that a pixel belongs to the background if the likelihood probability for the pixel is greater than the pixel threshold 195. It is even possible for the video processing system 120 to assign a pixel to the background if the likelihood probability for the pixel is within a range of pixel thresholds. However, it will be assumed herein, for simplicity, that a pixel is assumed to belong to the background if the likelihood probability is below a pixel threshold 195.

During normal operation, the background-foreground segmentation process 200 determines the segmented image 190 from the input image by using the probability tables 165 and the pixel threshold 195. Additionally, probability models (not shown) are used by the background-foreground segmentation process 200 to determine the likelihood probability for each pixel. Preferred probability models are discussed below in detail. These probability models are "built into" the background-foreground segmentation process 200 (and 300) in the sense that the background-foreground segmentation process 200 performs a series of steps in accordance with the models. In other words, the background-foreground segmentation process 200 has its steps defined, at least in part, by a probability model or models. For the sake of simplicity, the probability model used to perform the background-foreground segmentation and the background-foreground segmentation process will be considered interchangeable. However, it should be noted that the background-foreground segmentation process, while performing the steps necessary to determine probabilities according to a model, may have additional steps not related to determining probabilities according to a model. For instance, retrieving data from input image 155 and storing such data in a data structure is one potential step that is not performed according to a probability model.

During training, the background-foreground segmentation process 300 defines and refines the probability tables 170-11 through 170-HW (collectively, "probability tables 170" herein). Preferably, there is one probability table for each pixel of input image 155. Each probability table will have an M×N matrix, illustrated for probability table 170-11 as entries 175-11 through 175-NM (collectively, "entries 175" herein). There will be M global states and N Gaussian modes for each pixel. Generally, each probability table 170 will start with one global state and one Gaussian mode and, after training, contain the M×N entries 175.

During training, global threshold 180 is used by the background-foreground segmentation process 300 to determine whether a state should be added or parameters of a selected state modified. The pixel threshold 195 is used, during training, to determine whether another Gaussian mode should be added or whether parameters of a selected Gaussian mode should be adjusted.

It should be noted that the exemplary background-foreground segmentation process 300 allows training to be incremental. The exemplary background-foreground segmentation process 300 allows parameters of the model to be adjusted every time an image is passed to the model or after a predetermined number of images have been passed to the model. The former is preferred although the latter is possible.

As is known in the art, the methods and apparatus discussed herein may be distributed as an article of manufacture that itself comprises a computer-readable medium having computer-readable code means embodied thereon. The computer-readable program code means is operable, in conjunction with a computer system such as video processing system 120, to carry out all or some of the steps to perform the methods or create the apparatuses discussed herein. The computer-readable medium may be a recordable medium (e.g., floppy disks, hard drives, compact disks such as DVD 110 accessed through medium interface 135, or memory cards) or may be a transmission medium (e.g., a network 115 comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as DVD 110.

Memory 145 will configure the processor 130 to implement the methods, steps, and functions disclosed herein. The memory 145 could be distributed or local and the processor 130 could be distributed or singular. The memory 145 could be implemented as an electrical, magnetic or optical memory, or any combination of these or other types of storage devices. The term "memory" should be construed broadly enough to encompass any information able to be read from or written to an address in the addressable space accessed by processor 130. With this definition, information on a network, such as network 115 accessed through network interface 140, is still within memory 145 of the video processing system 120 because the processor 130 can retrieve the information from the network. It should also be noted that all or portions of video processing system 120 may be made into an integrated circuit or other similar device, such as a programmable logic circuit.

Now that a system has been discussed, probability models will be discussed that can provide global and local pixel dependencies and incremental training.

Probability Models

In a preferred probabilistic framework, images (i.e., two-dimensional array of pixel appearances) are interpreted as samples drawn from a high-dimensional random process. In this process, the number of pixels of the image defines the number of dimensions. More formally, let $I=\{I_{x,y} \in \Theta^{WH}\}$ represent an image of W×H pixels with values in the observation space $\Theta$ (i.e., RGB values at 24 bits per pixel).

The probability distributions associated with that random process, $P(I|\Omega)$, would capture the underlying image-generating process associated with both the scene and the imaging system. This includes the colors and textures present in the scene as well as the various sources of image variations such as motion in the scene, light changes, auto-gain control of the camera, and other image variations.

Most conventional algorithms model the images of a scene assuming each of the pixels as independent from each other. In practice, the image-formation processes and the physical characteristics of typical scenes impose a number of constraints that make the pixels very much inter-dependant in both the global sense (i.e., the whole image or a series of images) as well as in the local sense (i.e., regions within the image).

The proposed exemplary model exploits the dependency among the pixels within the images of a scene by introducing a hidden process $\xi$ that captures the global state of the observation of the scene. For example, in the case of a scene with several possible illumination settings, a discrete variable $\xi$ could represent a pointer to a finite number of possible illumination states.

A basic idea behind the proposed model is to separate the model term that captures the dependency among the pixels in the image from the one that captures the appearances of each of the pixels so that the problem becomes more tractable. That is, it is beneficial to compute the likelihood probability of the image from:

$$P(I|\Omega) = \sum_{\forall \xi} P(I|\xi, \Omega) P(\xi|\Omega), \quad \{1\}$$

where $P(\xi|\Omega)$ represents the probability of the global state of the scene, and $P(I|\xi, \Omega)$ represents the likelihood probability of the pixel appearances conditioned to the global state of the scene $\xi$. Note that as the dependency among the pixels is captured by the first term, it is reasonable to assume that, conditioned to the global state of the scene $\xi$, the pixels of the image I are independent from each other. Therefore, Equation {1} can be re-written as:

$$P(I|\Omega) = \sum_{\forall \xi} P(\xi|\Omega) \prod_{\forall(x,y)} P(I_{x,y}|\xi, \Omega), \quad \{2\}$$

where $P(I_{x,y}|\xi, \Omega)$ represents the probability used to model the (x, y) pixel of the image I.

Depending upon the complexity of the model used to capture the global state of the observation of a scene, namely $P(\xi|\Omega)$, the implemented process would be able to handle different types of imaging variations present in the various application scenarios. For example, it is feasible to implement a background-foreground segmentation process robust to the changes due to the auto-gain control of a camera, if a parameterized representation of the gain function is used in the representation of $\xi$.

In the interest of simplicity, each of the pixel values conditioned to a global state $\xi$, $P(I_{x,y}|\xi, \Omega)$, is modeled using a mixture-of-Gaussian distribution with full covariance matrix in the three-dimensional RGB-color space. More formally, one can use the following equation:

$$P(I_{x,y}|\xi, \Omega) = \sum_{\forall \alpha} P(\alpha_{x,y}) N\left(I; \bar{I}_{\alpha,x,y}, \sum_{\alpha,x,y}\right),$$

where $\bar{I}_{\alpha,x,y}$ and $\Sigma_{\alpha,x,y}$ are the mean value and the covariance matrix of the α-th mixture-of-Gaussian mode for the (x, y) pixel. These parameters are a subset of the symbolic parameter variable $\Omega$ used to represent to whole image model.

Note that previous research has shown that other color spaces are preferable to deal with issues such as shadows, and this research may be used herein if desired. However, the present description will emphasize modeling the global state of the scene.

The global state of the observation of a scene is preferably modeled using a discrete variable $\xi=\{1, 2, \ldots, M\}$ that captures global and local changes in the scene, so that Equation {2} becomes the following:

$$P(I|\Omega) = \sum_{\forall \xi} P(\alpha_{x,y}) \prod_{\forall(x,y)} \sum_{\forall \alpha} P(\alpha_{x,y}) N\left(I; \bar{I}_{\alpha,x,y}, \sum_{\alpha,x,y}\right). \quad \{3\}$$

Note the difference between the described model and the traditional mixture of Gaussians. The model of the present invention uses a collection of Gaussian distributions to model each pixel in connection to a global state, as opposed to a mixture-of-Gaussian distribution that models each of the pixels independently.

Equation 3 can be re-written as the following:

$$P(I|\Omega) = \sum_{\forall \xi} \prod_{\forall(x,y)} \sum_{\forall \alpha} G(\xi, \alpha_{x,y}) N\left(I; \bar{I}_{\alpha,x,y}, \sum_{\alpha,x,y}\right), \quad \{4\}$$

where the term $$G(\xi, \alpha_{x,y}) = P(\xi \mid \Omega)^{\frac{1}{WH}} P(\alpha_{x,y})$$

can be simply treated as M×N matrixes associated with each of the pixel positions of the image model. In this example, M is the number of global states, and N is the number of Gaussian modes. In the example of FIG. 1, the M×N matrixes are stored in probability tables 165, where there is one M×N matrix 170 for each pixel.

Segmentation Procedure

Assuming that one of the proposed models, discussed above, has been successfully trained from a set of image observations from a scene, the segmentation procedure of a newly observed image is simply based on maximum likelihood classification. Training is discussed in the next section.

An exemplary segmentation procedure is shown as method 200 of FIG. 2. Method 200 is used by a system during normal operation to perform background-foreground segmentation. As noted above, training has already been performed.

Method 200 begins in step 210 when an image is retrieved. Generally, each image is stored with 24 bits for each pixel of the image, the 24 bits corresponding to RGB values. As described above, other systems may be used, but exemplary method 200 assumes RGB values are being used.

Given the test image, $I^t$, the segmentation algorithm determines (step 220) the global state $\xi^*$ that maximizes the likelihood probability of the image given the following model:

$$\xi^* = \mathrm{argmax} P(\xi \mid \Omega) \prod_{\forall(x,y)} P(I^t_{x,y} \mid \xi, \Omega). \quad \{5\}$$

Figure 4:
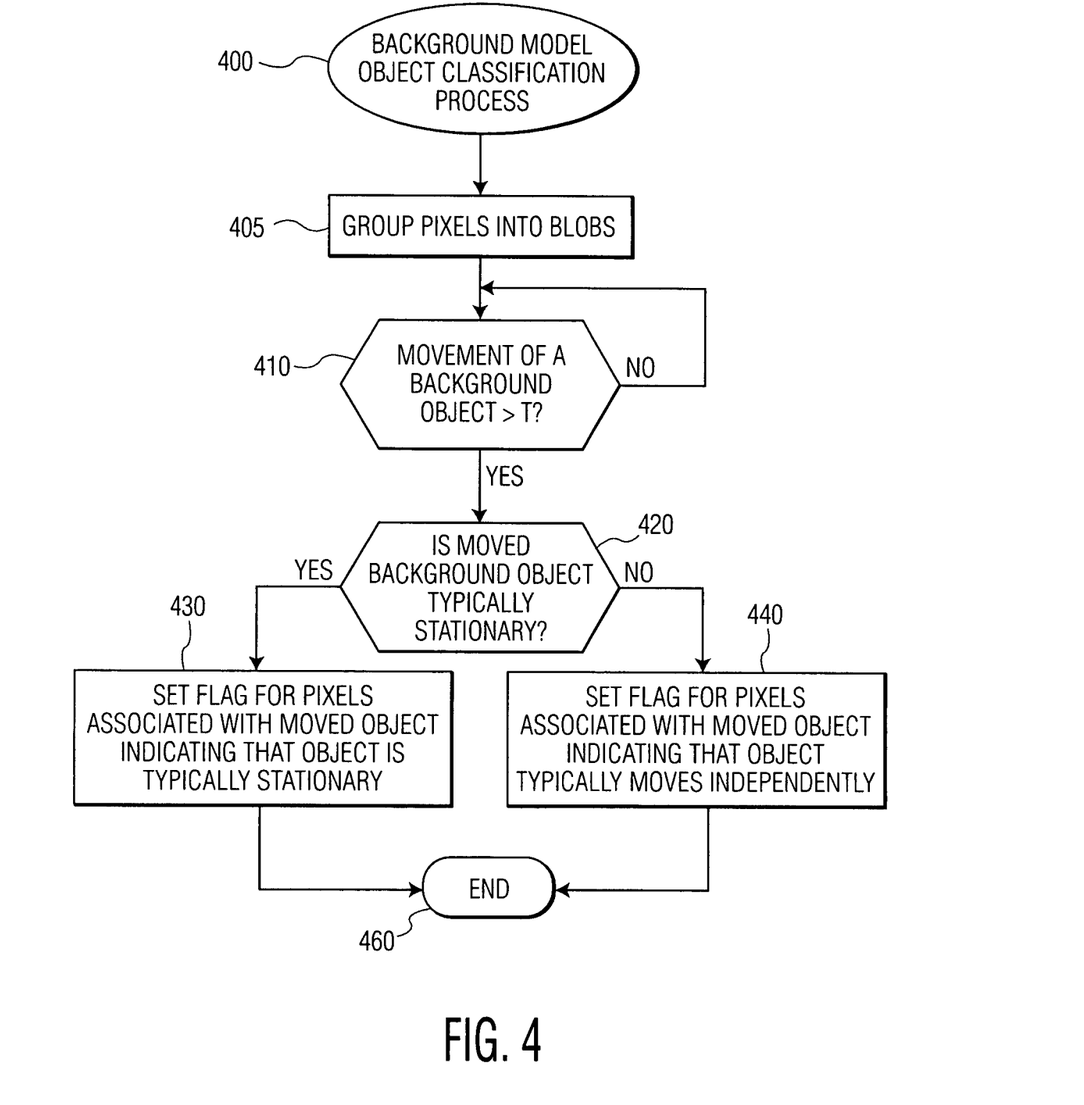
FIG. 4 is a flowchart describing an exemplary implementation of the background model object classification process of FIG. 1.

Then, the background-foreground segmentation is performed on each pixel independently using the individual likelihood probability, but only considering the most likely global state $\xi^*$. To perform this step, a pixel is selected in step 230. The individual likelihood probability for each pixel is determined for the most likely global state (step 240), and the likelihood probability is used in the following equation to determine whether each pixel should be assigned to the background or foreground (step 250):

$$s_{x,y} = \begin{cases} 1 & P(\xi^* \mid \Omega) P(I^t_{x,y} \mid \xi^*, \Omega) < P_{th} \\ 0 & \text{otherwise} \end{cases} \forall (x, y), \quad \{6\}$$

where $s=\{s_{x,y} \forall (x, y)\}$ represents a binary image of the background-foreground segmentation, where non-zero pixels indicate foreground objects. Basically, Equation {6} states that, if the likelihood probability for a pixel is less than a pixel threshold (step 250=YES), then a further test is performed during step 255 to determine if the pixel has been previously flagged as part of the background by the background model object classification process 400 in accordance with the present invention, otherwise (step 250=NO) the pixel is assigned to the background (step 270).

If it is determined during step 255 that the pixel has been previously flagged as part of the background by the background model object classification process 400, then the pixel is assigned to the background during step 270. If, however, it is determined during step 255 that the pixel has not been previously flagged as part of the background by the background model object classification process 400, then the pixel is assigned to the foreground (step 260).

Equation {6} is performed for each pixel of interest (generally, all the pixels in an image). Thus, in step 280, if all pixels in the image have been assigned to the background or foreground (step 280=NO), then the method 200 ends, otherwise (step 280=YES) the method continues in step 230 and Equation 6 is performed for a newly selected pixel.

Note how it is possible for process 200 to successfully classify a pixel as foreground even in the case that its color value is also modeled as part of the background under a different global state. For example, if a person wearing a red shirt walks by in the back of the scene during the training procedure, the red color would be captured by one of the mixture-of-Gaussian modes in all the pixels hit by that person's shirt. Later during testing, if that person walks again in the back of the scene (of course, roughly following the same path) he or she will not be detected as foreground. However, if that person comes close to the camera, effectively changing the global state of the scene, his or her red shirt would be properly segmented even in the image regions in which red has been associated with the background.

As an additional example, consider the case in which a part of the background looks (i) black under dark illumination in the scene, and (ii) dark green when the scene is properly illuminated. The models of the present invention, which exploit the overall dependency among pixels, would be able to detect black objects of the background when the scene is illuminated, as well as green foreground objects when the scene is dark. In traditional models, both black and green would have been taken as background colors, so that those objects would have been missed completely.

Training Procedure

Offline training of the proposed models with a given set of image samples (e.g., a video segment) is straightforward using the Expectation-Maximization (EM) algorithm. For example, the parameters of the individual pixel models, $$P(I^t_{x,y} \mid \xi^*, \Omega),$$

could be initialized randomly around the mean of the observed training data, while the probability of the individual states could be initialized uniformly. Then, using EM cycles, all the parameters of the model would be updated to a local-maximum solution, which typically is a good solution. The EM algorithm is a well known algorithm and is described, for instance, in A. Dempster, N. Laird, and D. Rubin, "Maximum Likelihood From Incomplete Data via the EM Algorithm," J. Roy. Statist. Soc. B 39:1–38 (1977), the disclosure of which is hereby incorporated by reference.

The exemplary training procedure described in FIG. 3 incrementally trains the models and automatically determines the appropriate number of global states. Incremental training of the models allows the processes to run continuously over long periods of time, in order to capture a complete set of training samples that include all the various image variations of the modeled scene. The automatic determination of the number of global states minimizes the size of the model, which, in turn, reduces the memory requirements of the process and speeds up the background-foreground segmentation procedure.

An exemplary training process is shown in FIG. 3. This exemplary training process comprises an incremental procedure in which an unlimited number of training samples can be passed to the model. Every time a new sample image is passed to the model (i.e., a new image $I^t$ passed to the model in step 305), the process 300 first executes an expectation step (E-step, from the EM algorithm) determining the most likely global state ξ* (step 310) and the most likely mixture-of-Gaussian mode, $α_{x,y}$, of each pixel of the image (step 315). Note that these steps are similar to steps in the segmentation procedure process 200.

In step 320, the likelihood probability of the same image for the selected state is determined. Then, depending upon the value of the likelihood probability of the sample image for the selected global state (step 325), the process 300 selects between adjusting the parameters of the selected state (step 335) or adding a new one (step 330). If the likelihood probability of the sample image for the selected state is greater than a global threshold (step 325=YES), then the parameters of the selected state are adjusted (step 335). If the likelihood probability of the sample image for the selected state is less than or equal to a global threshold (step 325=NO), then a new state is added (step 330).

In step 340, the individual likelihood probabilities of the selected mixture-of-Gaussian modes for each pixel position are determined. Then, depending upon the individual likelihood probabilities of the selected mixture-of-Gaussian modes for each pixel position, the algorithm selects between adjusting the selected modes or adding new ones. To do this, in step 345, a pixel is selected. If the individual likelihood probability of the selected mixture-of-Gaussian modes for this pixel position is greater than a pixel threshold (step 350=YES), then the selected mode is adjusted (step 360), otherwise (step 350=NO) a new mode is added (step 355). If there are more pixels (step 365=YES), the method 300 continues in step 345, otherwise (step 365=NO), the method continues in step 370. If there are more sample images to process (step 370=YES), the method 300 continues in step 305, otherwise (step 370=NO) the method ends.

Note that two thresholds are used in the exemplary training method 300: one for the decision at each pixel position, and the other for the decision about the global state of the image.

Each mixture-of-Gaussian mode of every pixel position preferably keeps track of the total number of samples used to compute its parameters, so that when a new sample is added, the re-estimation of the parameters is carried out incrementally. For example, means and covariances of the mixture-of-Gaussian modes are simply updated using:

$$\bar{I}_{α,x,y} = \frac{1}{(1+K_{α,x,y})}\{I^t_{x,y} + K_{α,x,y}\bar{I}_{α,x,y}\},$$

$$\sum_{α,x,y} = \frac{1}{K_{α,x,y}}\left[(I^t_{x,y}-\bar{I}_{α,x,y})'(I^t_{x,y}-\bar{I}_{α,x,y}) + (1-K_{α,x,y})\sum_{α,x,y}\right],$$

where $k_{α,x,y}$ is the number of samples already used for training that mixture-of-Gaussian mode.

Similarly, each global state keeps track of the total number of samples used for training, so that when a sample is added, the probability tables $G(ξ, α_{x,y})$ are updated using the usage statistics of the individual states and mixture-of-Gaussian modes, considering the addition of the new sample.

Beneficially, the overall model is initialized with only one state and one mixture-of-Gaussian mode for each pixel position. Also, a minimum of 10 samples should be required before a global state and/or a mixture-of-Gaussian mode is used in the expectation step (steps 315 and 320).

Enhancement of Background Model

As previously indicated, the background-foreground segmentation process 300 defines and refines the probability tables 170-11 through 170-HW (collectively, "probability tables 170" herein) during the training phase. Initially, the probability tables 170 comprise a probability table for each pixel of input image 155. As discussed hereinafter in conjunction with FIG. 4, the background model object classification process 400 modifies the probability tables 170 of the background model to contain an indication of objects that are typically stationary. In this manner, if an object moves and has been previously identified as an object that is typically stationary, the object will not unnecessarily become part of the foreground during background-foreground segmentation.

In the exemplary implementation of the background model object classification process 400, moving objects are classified into one of two sets. The first set includes objects that typically move independently, such as humans and animals and the second set includes objects that are typically stationary, such as furniture. Generally, once an object is assigned to the second set, the object will remain in the background, even if the object is moved (normally, movement of the object would cause the object to become part of the foreground). In this manner, background objects do not unnecessarily become part of the foreground when they are moved.

FIG. 4 is a flow chart describing an exemplary background model object classification process 400 incorporating features of the present invention. As shown in FIG. 4, the background model object classification process 400 initially groups pixels in the foreground of each image during step 405 using known connected component analysis techniques to form rigid objects, referred to as a blob.

A test is then performed during step 410 until it is determined that a background object has moved by more than a specified threshold, T. The movement of a background object can be detected, for example, using well known optical flow methods. Generally, the background is suppressed in two consecutive images, and the foregrounds are subtracted to detect movement, how far a given object has moved and the speed of movement. Aspect ratio information and multiple frame processing techniques can be employed, as described, for example, in U.S. patent application Ser. No. 09/794,443, filed Feb. 27, 2001, entitled "Classification of Objects Through Model Ensembles," incorporated by reference herein.

Once the motion of a background object is detected during step 410, a further test is performed during step 420 to determine if the background object that has moved is typically stationary. For example, the techniques described in the above-referenced U.S. patent application Ser. No. 09/794,443, filed Feb. 27, 2001, entitled "Classification of Objects Through Model Ensembles," can be used to classify an object as an inanimate object, for example, such as a piece of furniture, and a set of rules can be established to indicate whether certain classified objects are typically stationary.

If it is determined during step 420 that the background object that has moved is typically stationary, then a flag is set during step 430 for the pixels associated with the object indicating that the moved object is typically stationary.

If, however, it is determined during step 420 that the background object that has moved is not typically stationary, then a flag is set during step 440 for the pixels associated with the object indicating that the moved object typically moves independently. Program control then terminates during step 460 until the motion of a background object is again detected during step 410.

Additional Embodiments

It is a common practice to approximate the probability of a mixture of Gaussians with the Gaussian mode with highest probability to eliminate the need for the sum, which prevents the further simplification of the equations.

Using that approximation at both levels, (a) the sum of the mixtures for each pixel becomes the following:

$$\sum_{\forall \alpha} G(\xi, \alpha_{x,y}) N\left(I; \bar{I}_{\alpha,x,y}, \sum_{\alpha,x,y}\right) \approx \max_{x,y} G(\xi, \alpha_{x,y}) N\left(I; \bar{I}_{\alpha,x,y}, \sum_{\alpha,x,y}\right),$$

and (b) the sum of the various global states becomes the following:

$$\sum_{\forall \alpha} P(I \mid \xi, \Omega) P(\xi \mid \Omega) \approx \max_{\xi} P(I \mid \xi, \Omega) P(\xi, \Omega).$$

Equation {4} simplifies to the following:

$$P(I \mid \Omega) \approx \max_{\xi} \prod_{\forall (x,y)} \max_{\alpha_{x,y}} G(\xi, \alpha_{x,y}) N\left(I; \bar{I}_{\alpha,x,y}, \sum_{\alpha,x,y}\right). \quad \{7\}$$

Note the double maximization. The first one, at pixel level, is used to determine the best matching Gaussian mode considering the prior of each of the global states. The second one, at image level, is used to determine the state with most likelihood probability of observation.

Another common practice to speed up the implementation of this family of algorithms is the computation of the logarithm of the probability rather than the actual probability. In that case, there is no need for the evaluation the exponential function of the Gaussian distribution, and the product of Equation {7} becomes a sum which can be implemented using fixed-point operations because of the reduced range of the logarithm.

It should be noted that the models described herein may be modified so that a test step currently written to perform one function if a probability is above a threshold may be re-written, under modified rules, so that the same test step will perform the same function if a probability is below a threshold or in a certain range of values. The test steps are merely exemplary for the particular example model being discussed. Different models may require different testing steps.

It is to be understood that the embodiments and variations shown and described herein are merely illustrative of the principles of this invention and that various modifications may be implemented by those skilled in the art without departing from the scope and spirit of the invention.

What is claimed is:

1. A method, comprising:
   retrieving a plurality of images from a location that is substantially stationary relative to a scene, each image of the plurality of images of said scene comprising a plurality of pixels;
   obtaining a background model of said scene, wherein obtaining the background model comprises determining at least one probability distribution corresponding to pixels of each image of the plurality of images, the step of determining performed by using a model wherein at least some pixels in each image of the plurality of images are modeled as being dependent on other pixels, further wherein said background model comprises (i) a term representing a probability of a global state of the scene and (ii) a term representing a probability of pixel appearances conditioned to the global state of the scene, wherein the global state of the scene is other than a global motion state of the scene; and
   providing two indications in said background model for moving objects, a first indication for objects that typically move independently relative to said scene and a second indication for objects that are typically stationary relative to said scene, wherein the background model further comprises an object classification process that modifies probability tables for relevant pixels of an image of the plurality of images of the background model to contain the second indication.

2. The method of claim 1, further comprising the step of transferring pixel information associated with a moved object to a new location of said object.

3. The method of claim 1, further comprising the step of maintaining an object with said second indication in said background even if said object is moved independent of said scene.

4. The method of claim 3, wherein said motion of an object in said background model is detected using an optical flow method.

5. The method of claim 4, wherein said optical flow method indicates a new location in said image of said moved object.

6. The method of claim 1, wherein said second indication that an object in said background model is typically stationary is provided even when said object is moved by more than a specified threshold.

7. The method of claim 1, wherein the method further comprises the steps of:
   providing a training image to the model;
   determining parameters of the model; and
   performing the step of providing a training image and determining parameters for a predetermined number of training images.

8. A system comprising:
   a memory that stores computer-readable code; and
   a processor operatively coupled to said memory, said processor configured to implement said computer-readable code, said computer-readable code configured to:
      retrieve a plurality of images from a location that is substantially stationary relative to a scene, each image of the plurality of images of said scene comprising a plurality of pixels;
      obtain a background model of said scene, wherein obtaining the background model comprises determining at least one probability distribution corresponding to pixels of each image of the plurality of images, the step of determining performed by using a model wherein at least some pixels in each image of the plurality of images are modeled as being dependent on other pixels, further wherein said background model comprises (i) a term representing a probability of a global state of the scene and (ii) a term representing a probability of pixel appearances conditioned to the global state of the scene, wherein the global state of the scene is other than a global motion state of the scene; and provide two indications in said background model for moving objects, a first indication for objects that typically move independently relative to said scene and a second indication for objects that are typically stationary relative to said scene, wherein the background model further comprises an object classification process that modifies probability tables for relevant pixels of an image of the plurality of images of the background model to contain the second indication.

9. The system of claim 8, wherein said processor is further configured to transfer pixel information associated with a moved object to a new location of said object.

10. The system of claim 8, wherein said processor is further configured to maintain an object with said second indication in said background even if said object is moved independent of said scene.

11. The system of claim 10, wherein said motion of an object in said background model is detected using an optical flow system.

12. The system of claim 11, wherein said optical flow system indicates a new location in said image of said moved object.

13. The system of claim 8, wherein said second indication that an object in said background model is typically stationary is provided even when said object is moved by more than a specified threshold.

14. A computer-readable medium having computer-readable code embodied thereon, said computer-readable program code comprising:

a step to retrieve a plurality of images from a location that is substantially stationary relative to a scene, each image of the plurality of images of said scene comprising a plurality of pixels;

a step to obtain a background model of said scene, wherein obtaining the background model comprises determining at least one probability distribution corresponding to pixels of each image of the plurality of images, the step of determining performed by using a model wherein at least some pixels in each image of the plurality of images are modeled as being dependent on other pixels, further wherein said background model comprises (i) a term representing a probability of a global state of the scene and (ii) a term representing a probability of pixel appearances conditioned to the global state of the scene, wherein the global state of the scene is other than a global motion state of the scene; and a step to provide two indications in said background model for moving objects, a first indication for objects that typically move independently relative to said scene and a second indication for objects that are typically stationary relative to said scene, wherein the background model further comprises an object classification process that modifies probability tables for relevant pixels of an image of the plurality of images of the background model to contain the second indication.

15. The computer readable medium of claim 14, wherein the global state of said scene is one of a global illumination and a global color of said scene.

16. A method, comprising:

retrieving a plurality of images from a location that is substantially stationary relative to a scene, each image of the plurality of images of said scene comprising a plurality of pixels;

obtaining a background model of said scene, wherein obtaining the background model comprises determining at least one probability distribution corresponding to pixels of each image of the plurality of images, the step of determining performed by using a model wherein at least some pixels in each image of the plurality of images are modeled as being dependent on other pixels, further wherein said background model comprises (i) a term representing a probability of a global state of the scene and (ii) a term representing a probability of pixel appearances conditioned to the global state of the scene, wherein the global state of the scene is other than a global motion state of the scene; and providing two indications in said background model for moving objects, a first indication for an object that typically moves independently relative to said scene and a second indication for an object that is an inanimate object relative to said scene, wherein the background model further comprises an object classification process that modifies probability tables for relevant pixels of an image of the plurality of images of the background model to contain the second indication.

17. The method of claim 16, further comprising the step of maintaining said inanimate object in said background even if said inanimate object is moved independent of said scene.

* * * * *